UNITED STATES PATENT OFFICE.

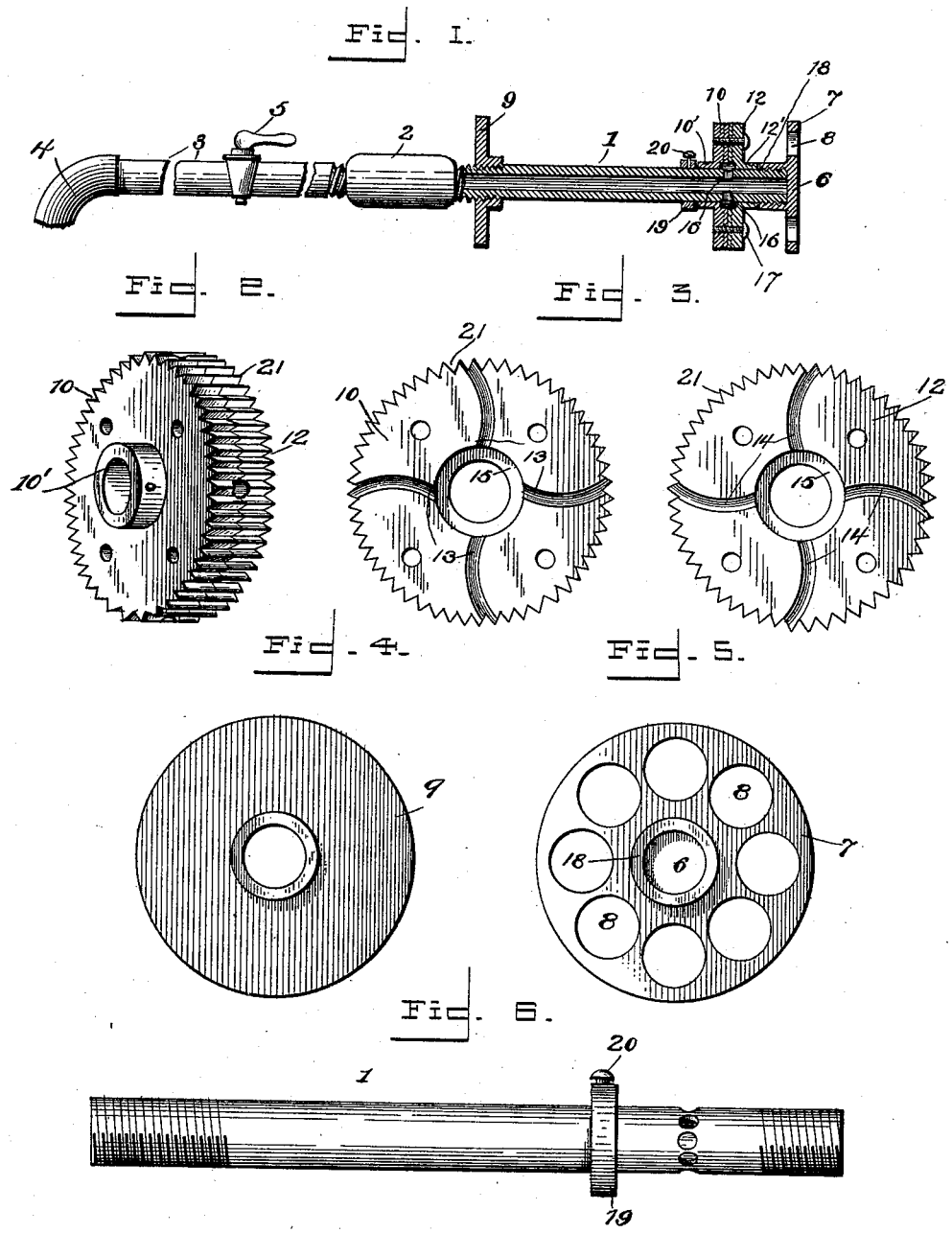

ROBERT G. BIDWELL, OF WASHINGTON, DISTRICT OF COLUMBIA, ASSIGNOR OF ONE-FOURTH TO S. G. FRENCH, JR., OF PENSACOLA, FLORIDA.

ROTARY BOILER-FLUE CLEANER.

SPECIFICATION forming part of Letters Patent No. 599,825, dated March 1, 1898.

Application filed June 26, 1897. Serial No. 642,513. (No model.)

*To all whom it may concern:*

Be it known that I, ROBERT G. BIDWELL, a citizen of the United States, residing at Washington, in the District of Columbia, have invented certain new and useful Improvements in Rotary Boiler-Flue Cleaners; and I do declare the following to be a full, clear, and exact description of the invention, such as will enable others skilled in the art to which it appertains to make and use the same.

My invention relates to a novel form of boiler-flue cleaner; and the object is to provide a simple, inexpensive, and effective as well as a durable device of this kind.

To this end the invention consists in the construction, combination, and arrangement of the several parts of the same, as will be hereinafter more fully described, and particularly pointed out in the claims.

In the accompanying drawings the same reference characters indicate the same parts of the invention.

Figure 1 is a longitudinal section of my improved rotary boiler-flue cleaner. Fig. 2 is a perspective view of the rotary cleaner-head. Fig. 3 is a plan view of the contiguous faces of the two sections comprising said head. Fig. 4 is a plan view of the cap. Fig. 5 is a similar view of the guide-washer, and Fig. 6 is a perspective view of the tubular shank.

1 represents a tubular shank screw-threaded at each end, and 2 represents a socket connection removably secured to the inner threaded end of the tubular shank 1 to receive the tubular handle 3, by means of which the handle may be operated to manipulate the tool. The opposite end of the tubular handle 3 is connected to a flexible pipe 4, which in turn communicates with the boiler or other source of steam-supply, (not shown,) so that there may be a free supply of live steam from the boiler to the tubular shank 1.

A valve or plug-cock 5 forms a part of the handle 3 for conveniently controlling the steam-pressure. The outer threaded end of the shank 1 receives a flanged cap 6, which closes the end of said shank, and its flange 7 is provided with a series of orifices 8 8, as shown.

An imperforate washer 9 of the same diameter as the flanged cap 6 is removably secured to the inner or opposite end of the shank 1, and this washer and the flanged cap act as parallel guides for the insertion and manipulation of the shank when inserted in the flue.

The rotating head is composed of two counterpart disks 10 12, and they are formed with integral alined sleeves 10' 12', which form a bearing on the shank 1. The contiguous faces of these disks 10 and 12 are formed with alined crescent-shaped radial grooves 13 14, which begin at the periphery and terminate in an annular channel 15, formed in the contiguous faces of the disks, and which communicate with a series of alined radial orifices 16 16 in the tubular shank 1. These disks are secured together by the machine-screws 17 17, extending transversely through them, and the head itself is secured in place on the tubular shank between the shoulder 18 of the cap 6 and the collar 19, adjustably secured to the shank on the opposite side of the rotating head by the set-screw 20.

The circumference of the rotary head is provided with a continuous series of radial serrations 21 21, which are preferably case-hardened to withstand wear and tear when in use.

The operation of the cleaner is as follows: The parts being adjusted as shown in Fig. 1 and the tubular shank in communication with the boiler or other source of live-steam supply, the shank is inserted in the boiler-flue and the steam admitted through the valve 5, and as it escapes through the crescent-shaped radial grooves in the head impinges against the walls of the flue at a tangent, which produces a reactionary movement of the head in the flue, the impact of the steam loosening the soot or accumulated carbon and the serrations on the head removing it from the walls of the flue, and the draft caused by the exhaust-steam discharges the refuse matter through the orifices 8 8 in the flanged cap.

The operation is practically instantaneous, as it only requires the passage of the tool through the flue once and return to effectually cleanse it.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. A steam-boiler-flue cleaner comprising a tubular shank, a cylindrical head mounted on said shank its periphery formed with a series of transverse, parallel serrations, and provided with radial passages communicating with said tubular shank, and means as described for imparting a rotary motion to said cylindrical head on said shank, as and for the purpose set forth.

2. A steam-boiler-flue cleaner, comprising the tubular shank 1, closed at one end, and provided with radial orifices 16 16, in combination with the rotating head its periphery formed with a continuous series of integral parallel serrations and mounted on said shank and provided with a series of crescent-shaped radial passages communicating with the orifices in said shank, substantially as shown and described.

3. The tubular shank 1, provided with the orifices 16 16, the cap 6 fixed to one end of said shank and the washer 9 fixed on the opposite end thereof, in combination with the rotary head loosely mounted on said tubular shank, and comprising the serrated disks 10 12, having contiguous alined radial grooves 13 14, the inner ends of which communicate with said orifices 16 16, on said shank, substantially as shown and described.

In testimony whereof I hereunto affix my signature in presence of two witnesses.

ROBERT G. BIDWELL.

Witnesses:
H. J. ENNIS,
A. P. SCHELL.